(12) United States Patent
Pezeshki et al.

(10) Patent No.: US 11,979,844 B2
(45) Date of Patent: May 7, 2024

(54) SIGNALING OF ASSISTANCE INFORMATION ASSOCIATED WITH A GEOGRAPHIC AREA

(71) Applicant: QUALCOMM Incorporated, San Diego, CA (US)

(72) Inventors: Hamed Pezeshki, San Diego, CA (US); Tao Luo, San Diego, CA (US); Taesang Yoo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 17/230,658

(22) Filed: Apr. 14, 2021

(65) Prior Publication Data

US 2022/0338145 A1 Oct. 20, 2022

(51) Int. Cl.
*H04W 56/00* (2009.01)
*G06N 20/00* (2019.01)

(52) U.S. Cl.
CPC .......... *H04W 56/006* (2013.01); *G06N 20/00* (2019.01); *H04W 56/001* (2013.01)

(58) Field of Classification Search
None
See application file for complete search history.

(56) References Cited

U.S. PATENT DOCUMENTS

| | | | |
|---|---|---|---|
| 2019/0207672 A1* | 7/2019 | Arora | H04B 7/18584 |
| 2020/0022041 A1* | 1/2020 | Ly | H04W 36/0085 |
| 2020/0059970 A1* | 2/2020 | Islam | H04W 74/006 |
| 2020/0204332 A1* | 6/2020 | Da | H04L 5/0092 |
| 2022/0225132 A1* | 7/2022 | Roy | H04B 7/18519 |
| 2022/0322256 A1* | 10/2022 | Cheng | H04W 74/0833 |
| 2022/0358730 A1* | 11/2022 | Otsuki | H04N 21/6587 |
| 2022/0377686 A1* | 11/2022 | Li | H04W 72/04 |

FOREIGN PATENT DOCUMENTS

| | | | | |
|---|---|---|---|---|
| WO | WO-2019037506 A1 * | 2/2019 | | H04L 27/2607 |
| WO | WO-2021094777 A1 * | 5/2021 | | G06F 1/163 |
| WO | WO-2022201003 A1 * | 9/2022 | | |

* cited by examiner

*Primary Examiner* — Rebecca E Song
(74) *Attorney, Agent, or Firm* — Harrity & Harrity, LLP

(57) ABSTRACT

Various aspects of the present disclosure generally relate to wireless communication. In some aspects, an apparatus for wireless communication at a user equipment (UE) may receive assistance information indicating synchronization signal block (SSB) set information associated with a geographic area. The UE may perform a wireless communication action based at least in part on the SSB set information. Numerous other aspects are described.

27 Claims, 10 Drawing Sheets

SIGNALING OF ASSISTANCE INFORMATION ASSOCIATED WITH A GEOGRAPHIC AREA

FIELD OF THE DISCLOSURE

Aspects of the present disclosure generally relate to wireless communication and to techniques and apparatuses for signaling of assistance information associated with a geographic area.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, an apparatus for wireless communication at a user equipment (UE) includes a memory, and one or more processors, coupled to the memory, configured to: receive assistance information indicating synchronization signal block (SSB) set information associated with a geographic area; and perform a wireless communication action based at least in part on the SSB set information.

In some aspects, an apparatus for wireless communication at a base station includes a memory, and one or more processors, coupled to the memory, configured to: determine SSB set information associated with a geographic area; and transmit assistance information indicating the SSB set information.

In some aspects, a method of wireless communication performed by a UE includes receiving assistance information indicating SSB set information associated with a geographic area; and performing a wireless communication action based at least in part on the SSB set information.

In some aspects, a method of wireless communication performed by a base station includes determining SSB set information associated with a geographic area; and transmitting assistance information indicating the SSB set information.

In some aspects, a non-transitory computer-readable medium storing a set of instructions for wireless communication includes one or more instructions that, when executed by one or more processors of a UE, cause the UE to: receive assistance information indicating SSB set information associated with a geographic area; and perform a wireless communication action based at least in part on the SSB set information.

In some aspects, a non-transitory computer-readable medium storing a set of instructions for wireless communication includes one or more instructions that, when executed by one or more processors of a base station, cause the base station to: determine SSB set information associated with a geographic area; and transmit assistance information indicating the SSB set information.

In some aspects, an apparatus for wireless communication includes means for receiving assistance information indicating SSB set information associated with a geographic area; and means for performing a wireless communication action based at least in part on the SSB set information.

In some aspects, an apparatus for wireless communication includes means for determining SSB set information associated with a geographic area; and means for transmitting assistance information indicating the SSB set information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
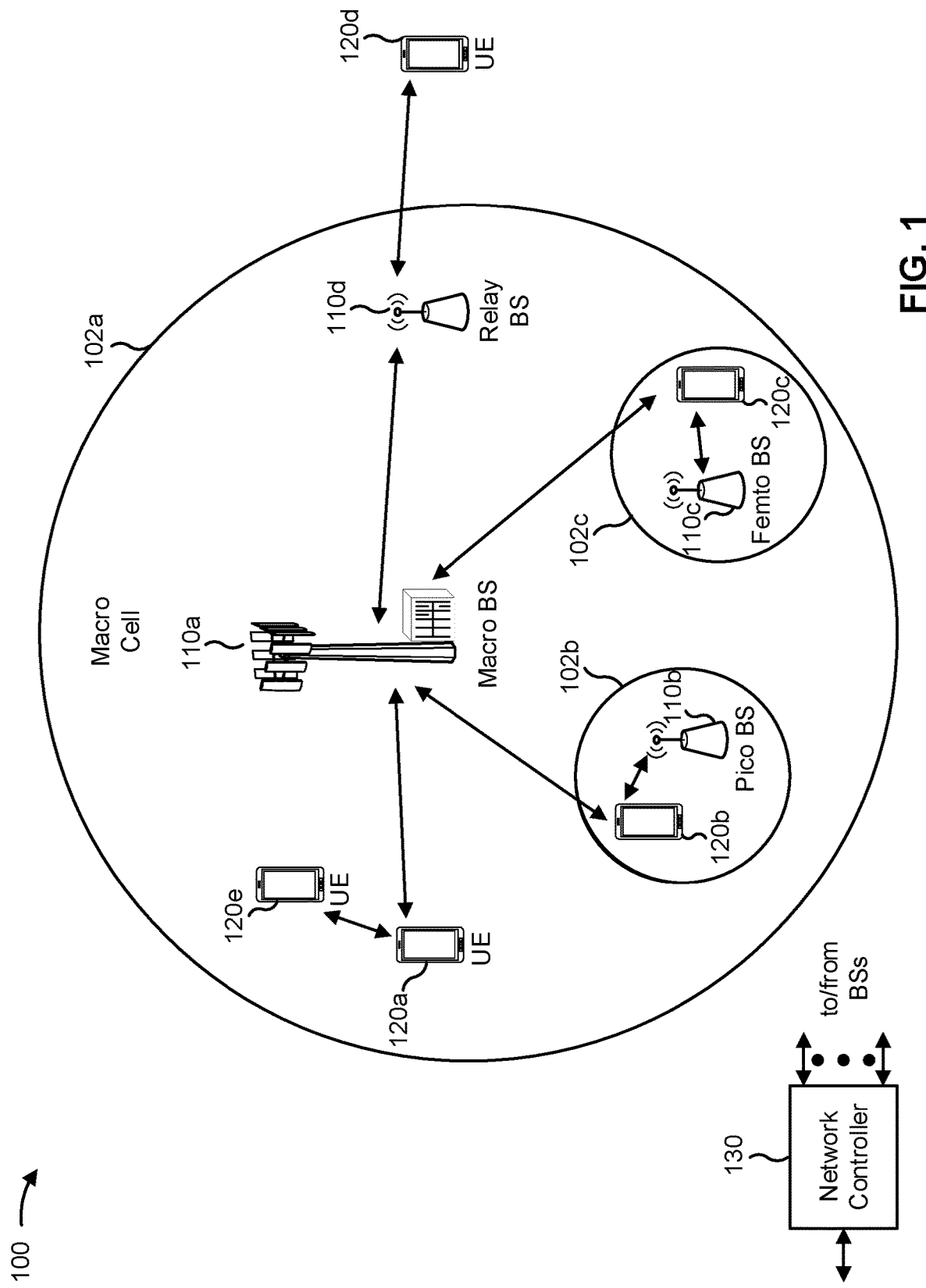
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
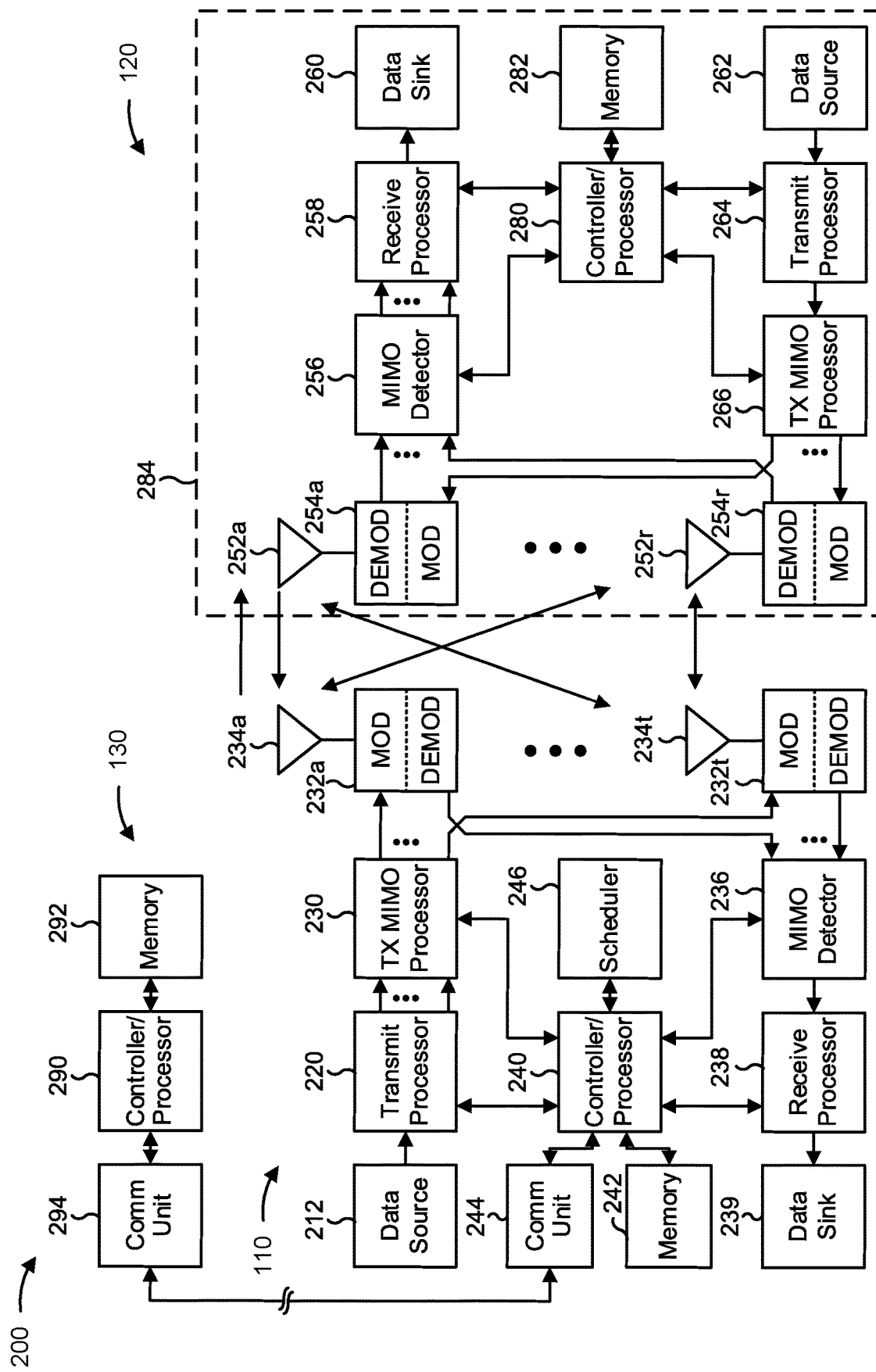
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure.

Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

Each of the antenna elements may include one or more sub-elements for radiating or receiving RF signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH).

The base station may indicate an activated TCI state to the UE, which the UE may use to select a beam for receiving the PDSCH.

A beam indication is an indication of a beam. A beam indication may be, or include, a TCI state information element, a beam identifier (ID), spatial relation information, a TCI state ID, a close loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-6).

Controller/processor 240 of base station 110, controller/processor 280 of UE 120, and/or any other component(s) of FIG. 2 may perform one or more techniques associated with signaling of assistance information associated with a geographic area, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE includes means for receiving assistance information indicating synchronization signal block (SSB) set information associated with a geographic area; and/or means for performing a wireless communication action based at least in part on the SSB set information. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for determining SSB set information associated with a geographic area; and/or means for transmitting assistance information indicating the SSB set information. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
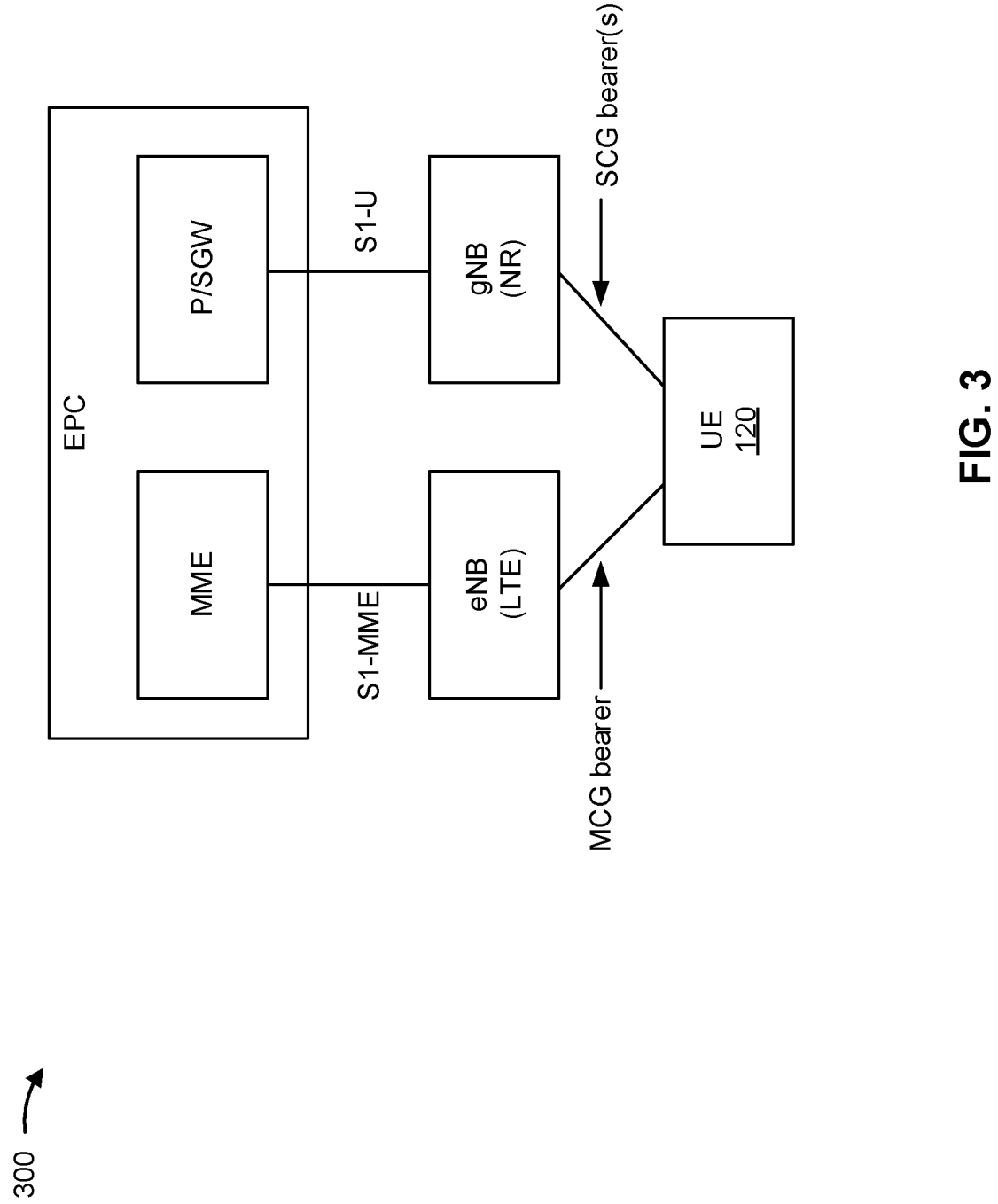
FIG. 3 is a diagram illustrating an example of dual connectivity, in accordance with the present disclosure.

As 5G/NR networks are deployed, some UEs may operate in a 5G standalone (SA) mode, where a UE connects only to a 5G/NR base station or a non-standalone (NSA) mode where the UE has dual connectivity, in which the UE connects to a 4G/LTE base station and a 5G/NR base station. FIG. 3 is a diagram illustrating an example 300 of dual connectivity, in accordance with the present disclosure. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., (e.g., where the MCG is associated with a first RAT and the SCG is associated with one of the first RAT or a second RAT). The ENDC mode is sometimes referred to as an NR or 5G NSA) mode. Thus, as used herein, "dual connectivity mode" may refer to an ENDC mode, an NEDC mode, an NRDC mode, and/or another type of dual connectivity mode.

As shown in FIG. 3, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In FIG. 3, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 3, in some aspects, a wireless network that permits operation in a 5G NSA mode may permit such operations using a master cell group (MCG) for a first RAT (e.g., an LTE RAT or a 4G RAT) and a secondary cell group (SCG) for a second RAT (e.g., an NR RAT or a 5G RAT). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs) and/or signaling radio bearers (SRBs)). For example, the UE 120 may transmit or receive data via the MCG and/or the SCG using one or more DRBs. Similarly, the UE 120 may transmit or receive control information (e.g., radio resource control (RRC) information and/or measurement reports) using one or more SRBs. In some aspects, a radio bearer may be dedicated to a specific cell group (e.g., a radio bearer may be an MCG bearer or an SCG bearer). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 3 is provided as an example. Other examples may differ from what is described with respect to FIG. 3.

Figure 4:
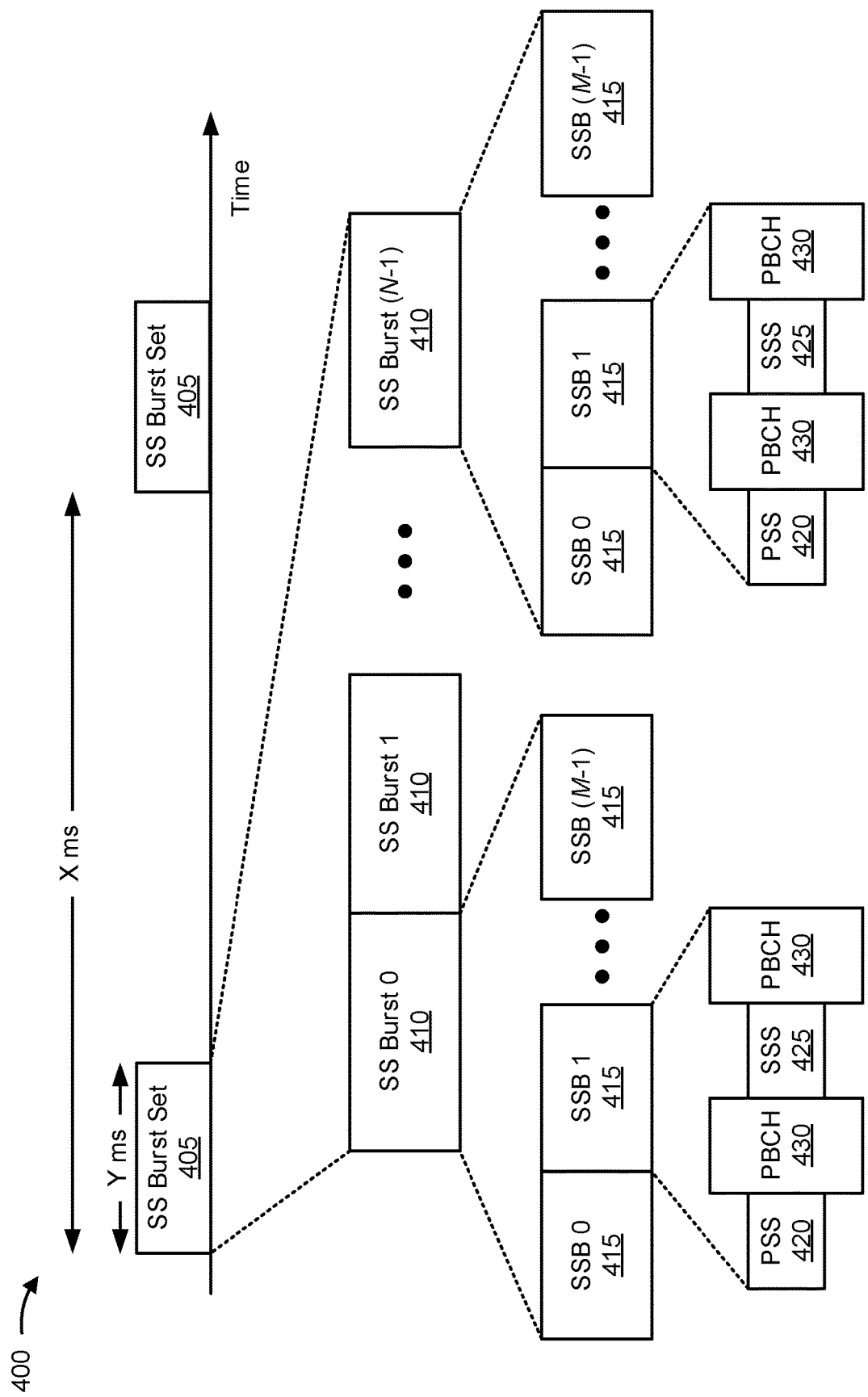
FIG. 4 is a diagram illustrating an example of a synchronization signal (SS) hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N-1, where N is a maximum number of repetitions of the SS burst 410 that may be transmitted by the base station. As further shown, each SS burst 410 may include one or more SS blocks (SSBs) 415, shown as SSB 0 through SSB M-1, where M is a maximum number of SSBs 415 that can be carried by an SS burst 410. In some aspects, different SSBs 415 may be beam-formed differently (e.g., transmitted using different beams), and may be used for cell search, cell acquisition, beam management, and/or beam selection (e.g., as part of an initial network access procedure). An SS burst set 405 may be periodically transmitted by a wireless node (e.g., base station 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window. In some aspects, an SSB burst may have a length of up to 5 milliseconds and a periodicity between 5 milliseconds and 160 milliseconds. In some aspects, the SSB burst may have a length of longer than 5 milliseconds and/or a periodicity of less than 5 milliseconds and/or greater than 160 milliseconds.

In some aspects, an SSB 415 may include resources that carry a primary synchronization signal (PSS) 420, a secondary synchronization signal (SSS) 425, and/or a physical broadcast channel (PBCH) 430. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., base station 110)

according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., a reference signal received power (RSRP) parameter) to a base station 110. The base station 110 and the UE 120 may use the one or more indicated SSBs 415 to select one or more beams to be used for communication between the base station 110 and the UE 120 (e.g., for a random access channel (RACH) procedure). Additionally, or alternatively, the UE 120 may use the SSB 415 and/or the SSB index to determine a cell timing for a cell via which the SSB 415 is received (e.g., a serving cell).

In some aspects of the disclosed subject matter, a UE 120 may receive assistance information from a base station 110 that may enable the UE 120 to attempt to decode the SSBs 415 that are associated with a geographic area, as opposed to attempting to decode all of the SSBs 415 in an SSB burst 410.

As indicated above, FIG. 4 is provided as an example. Other examples may differ from what is described with regard to FIG. 4.

Figure 5:
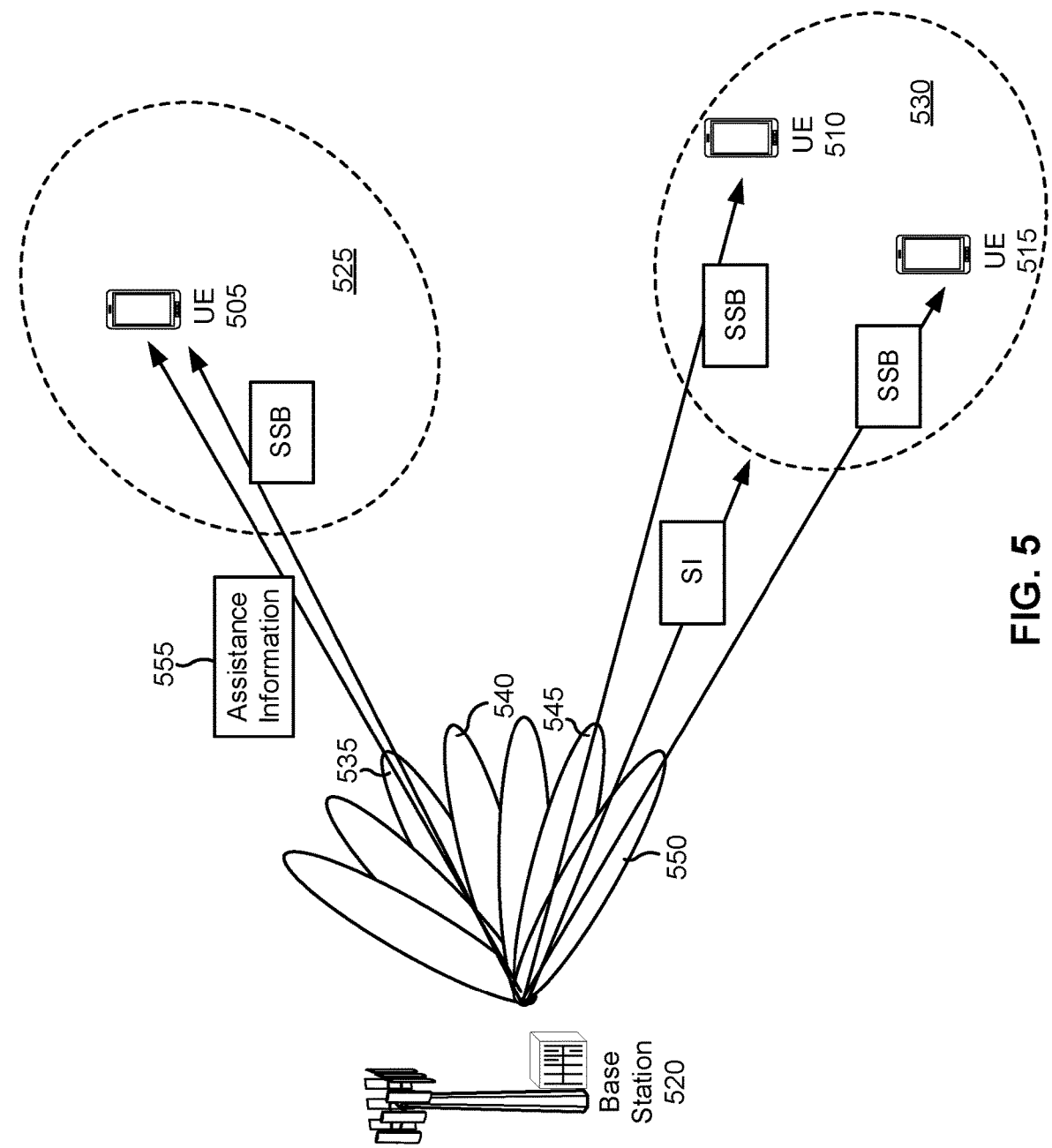
FIGS. 5 and 6 are diagrams illustrating examples associated with signaling of assistance information associated with a geographic area, in accordance with the present disclosure.

FIG. 5 is a diagram illustrating an example associated with signaling of assistance information associated with a geographic area, in accordance with the present disclosure. As shown in FIG. 5, a UE 505, a UE 510, and a UE 515 may communicate with a base station 520 in a wireless network (e.g., wireless network 100). In some aspects, the UE 505, the UE 510, and/or the UE 515 and the base station 520 may communicate in a connected mode or an initial access mode. In some aspects, the base station 520 may be associated with an SA deployment or an NSA deployment.

Example 500 depicts a beam management procedure. The beam management procedure may include, for example, a beam selection procedure, an initial beam acquisition procedure, a beam sweeping procedure, a cell search procedure, a beam search procedure, and/or a beam refinement procedure, among other examples. As shown in FIG. 5, the base station 520 may transmit one or more SSBs to the UEs 505, 510, and 515. The SSBs may be configured to be periodic.

The beam management procedure may include the base station 520 performing beam sweeping over multiple transmit (Tx) beams. The base station 520 may transmit an SSB using each transmit beam for beam management. For each transmit beam of the base station 520, the UEs 505, 510, and/or 515 may perform beam sweeping through the receive beams of the UEs 505, 510, and/or 515. As a result, the beam management procedure may enable the UEs 505, 510, and/or 515 to measure an SSB on different transmit beams using different receive beams to support selection and/or refinement of pairs of corresponding base station 520 transmit beams and receive beams of UEs 505, 510, and/or 515. The UE 505, 510, and/or 515 may report the measurements to the base station 520 to enable the base station 520 to select one or more beam pair(s) for communication between the base station 520 and the UEs 505, 510, and/or 515.

As shown, SSBs may be transmitted to different geographical areas 525 and 530 using different beams. For example, the base station 520 may transmit SSBs to a first geographical area 525 using a first beam 535 and a second beam 540. The base station 520 may transmit SSBs to a second geographical area 530 using a third beam 545 and a fourth beam 550. In cases in which the UEs 505, 510, and 515 are not aware of the geographical separation between the beams of the base station 520, the UEs 505, 510, and/or 515 may scan all of the beams of the base station 520 during a beam management procedure. For example, a UE may receive and attempt to decode all of the SSBs that can be received by the UE. This may lead to unnecessary power consumption and processing consumption, thereby having a negative impact on UE performance.

Some aspects of the techniques and apparatuses described herein may facilitate signaling of assistance information associated with a geographic area. In this way, a UE can attempt to decode the SSBs that are associated with the geographic area, as opposed to attempting to decode all of the SSBs in an SSB burst. For example, as shown in FIG. 5, in some aspects, the base station 520 may transmit assistance information 555 that may indicate SSB set information associated with the geographic area 525. For example, the SSB set information may indicate one or more SSB sets that are associated with the geographic area 525. In some aspects, as shown in FIG. 5, the base station 520 may broadcast system information (SI) that includes SSB set information associated with the geographic area 530. In this way, the UEs 505, 510, and 515 may decode only SSBs associated with the corresponding geographic area 525 or 530. As a result, some aspects described herein may reduce processing power and processing time consumption, thereby having a positive impact on the performance of UEs.

As indicated above, FIG. 5 is provided as an example. Other examples may differ from what is described with regard to FIG. 5.

Figure 6:
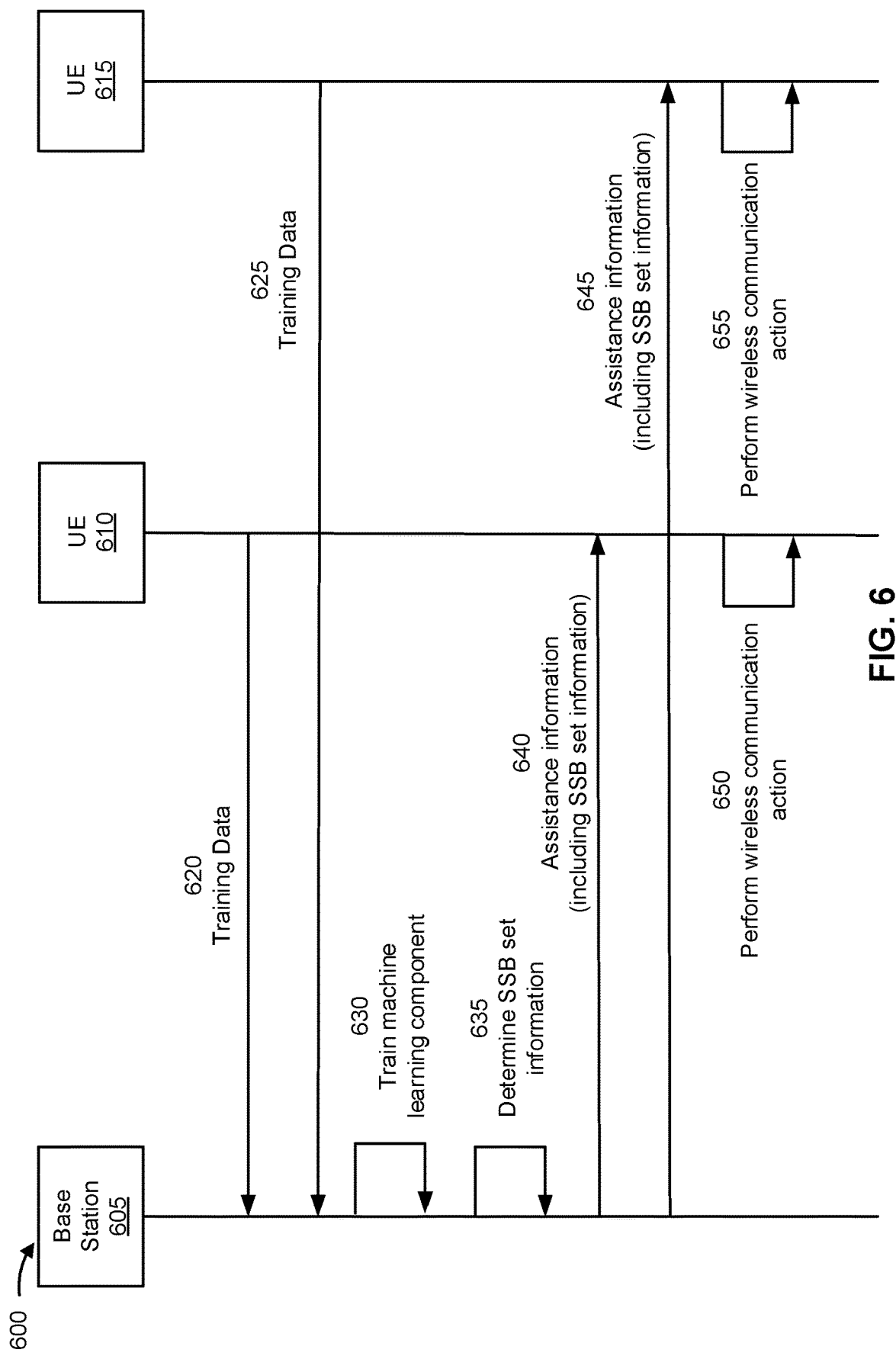

FIG. 6 is a diagram illustrating an example 600 associated with signaling of assistance information associated with a geographic area, in accordance with the present disclosure. As shown in FIG. 6, a base station 605 may communicate with a UE 610 and a UE 615. The UE 610 and/or the UE 615 may be, or be similar to, the UE 505, the UE 510, and/or the UE 515 depicted in FIG. 5 and/or the UE 120 depicted in FIGS. 1 and 2. In some aspects, the base station 605 may be, or be similar to, the base station 520 depicted in FIG. 5 and/or the base station 110 depicted in FIGS. 1 and 2.

As shown by reference number 620, the UE 610 may transmit, and the base station 605 may receive, a report indicating training data associated with a machine learning component of the base station 605. The machine learning component of the base station 605 may be configured to facilitate determining SSB set information. The training data may include UE position information, beam angle information, and/or channel measurement information, among other examples. As shown by reference number 625, the UE 615 also may transmit, and the base station 605 may receive, a report indicating training data associated with the machine learning component.

A machine learning component is a software component of a device (e.g., a client device, a server device, a UE, a base station, a TRP, etc.) that performs one or more machine learning procedures and/or that works with one or more other software and/or hardware components to perform one or more machine learning procedures. In one or more examples, a machine learning component may include, for example, software that may learn to perform a procedure without being explicitly trained to perform the procedure. A machine learning component may include, for example, a feature learning processing block (e.g., a software component that facilitates processing associated with feature learning) and/or a representation learning processing block (e.g., a software component that facilitates processing associated with representation learning). A machine learning component may include one or more neural networks, one or more classifiers, and/or one or more deep learning models, among other examples.

In some aspects, the machine learning component may be used to enhance a beam management procedure by using side information. Side information may include, for example, UE position information, angular information (e.g., angle of arrival (AoA) and/or angle of departure (AoD)), and/or channel measurements (e.g., sub-6 Giga-Hertz power delay profile (PDP) measurements), among other examples. The machine learning component may be configured to predict beam direction of SSB beams based at least in part on the side information. The SSB beam direction may be indicated by an SSB ID corresponding to an SSB set.

As shown by reference number 630, the base station 605 may train the machine learning component. For example, in some aspects, the base station 605 may train the machine learning component using the training data received from the UE 610 and/or the UE 615. In some aspects, the base station 605 may train the machine learning component using an offline training phase. In an offline training phase, the machine learning component may be trained using a supervised learning algorithm. For example, the base station 605 may train the machine learning component by providing the side information as input and providing selected SSB beam identifiers (IDs) for a corresponding UE location as labels. In a deployment phase, the base station 605 may independently measure UE location (and/or other side-information) and derive the SSB beam ID or SSB beam IDs corresponding to the SSB sets that are likely to be received by the UE in a corresponding geographic area using the trained machine learning component.

As shown by reference number 635, the base station 605 may determine SSB set information that indicates one or more SSB sets associated with a geographic area. For example, in some aspects, an SSB set may be associated with a geographic area by being designated as associated with the geographic area. In some aspects, an SSB set may be associated with a geographic area based at least in part on a determination that a metric associated with the SSB set satisfies a condition. For example, an SSB set may be associated with a geographic area based at least in part on a signal processing measurement (e.g., a determination that a channel quality information measurement associated with the SSB set satisfies a threshold).

In some aspects, the base station 605 may determine that an SSB set is associated with a geographic area based at least in part on an output of a machine learning component. In some aspects, the base station 605 may determine, using the machine learning component, that an SSB set satisfies a probability condition. For example, the machine learning component may determine a likelihood score corresponding to each SSB ID in an SSB set, and the base station 605 may determine that an SSB ID (and, thus, the corresponding SSB set) is associated with a geographic area if the likelihood score satisfies a threshold.

As shown by reference number 640, the base station 605 may transmit, and the UE 610 may receive, assistance information. The assistance information may indicate SSB set information associated with a geographic area. The SSB set information may indicate one or more SSB sets associated with the geographic area. In some aspects, the SSB set information may indicate a probability or relative likelihood of receiving, decoding, or otherwise detecting an identified SSB set in the geographic area.

As shown by reference number 645, the base station 605 also may transmit assistance information to the UE 615. For example, in some aspects, the base station 605 may broadcast the assistance information in system information (SI). In that case, for example, the assistance information may be location-specific (e.g., the assistance information may indicate one or more SSB sets likely to be detected by any UE in the geographic area). In some aspects, the base station 605 may transmit assistance information using unicast transmissions. The unicast transmissions may be location-specific and/or UE-specific.

In some aspects, the base station 605 may transmit assistance information while the UE 610 and/or the UE 615 is located in the geographic area. For example, in some aspects, the base station 605 may determine that the UE 610 and/or the UE 615 is located in the geographic area and may determine, based at least in part on determining that the UE 610 and/or the UE 615 is located in the geographic area, SSB set information associated with the geographic area. In some aspects, the base station 605 may determine SSB set information regardless of a location of the UE 610 and/or the UE 615, and may provide the assistance information based at least in part on a determination that the UE 610 and/or the UE 615 is in the geographic area and/or approaching the geographic area (e.g., within a threshold distance of the geographic area).

In some aspects, the base station 605 may update SSB set information by transmitting to the UE 610 and/or the UE 615 additional assistance information that indicates a difference between the SSB set information and additional SSB set information. In some aspects, for example, the additional assistance information may be determined based at least in part on a determination that the UE 610 and/or the UE 615 has moved to an additional geographic area. In some aspects, the additional SSB set information may be based on information that the base station may acquire and that is associated with a more accurate position of the UE. For example, the initial SSB set information may be based on an area in which the UE is located, and the additional SSB set information may include a more refined SSB set based on more accurate information associated with the UE's position.

In some aspects, the base station 605 may transmit, and the UE 610 and/or the UE 615 may receive, the assistance information in a paging message. The paging message may include the assistance information and geographic location information (e.g., an indication of the geographic area).

As shown by reference numbers 650 and 655, the UE 610 and/or the UE 615 may perform a wireless communication action based at least in part on the SSB set information. Performing the wireless communication action may include communicating with the base station 605 using at least one of an initial access mode or a connected mode and based at least in part on the SSB set information.

For example, in some aspects, the base station 605 may be associated with an NSA deployment, and the UE 610 and/or the UE 615 may leverage the SSB set information during an initial access mode and/or during a connected mode to identify a subset of SSBs to decode for beam selection and/or refinement. In some aspects, for example, the UE 610 and/or the UE 615 may access assistance information via SI broadcast by an anchor device in an anchor-client implementation of an NSA deployment. In some aspects, the base station 605 may be associated with an SA deployment, and the UE 610 and/or the UE 615 may leverage the SSB set information in a connected mode to identify a subset of SSBs to decode for beam selection and/or refinement.

As indicated above, FIG. 6 is provided as an example. Other examples may differ from what is described with respect to FIG. 6.

Figure 7:
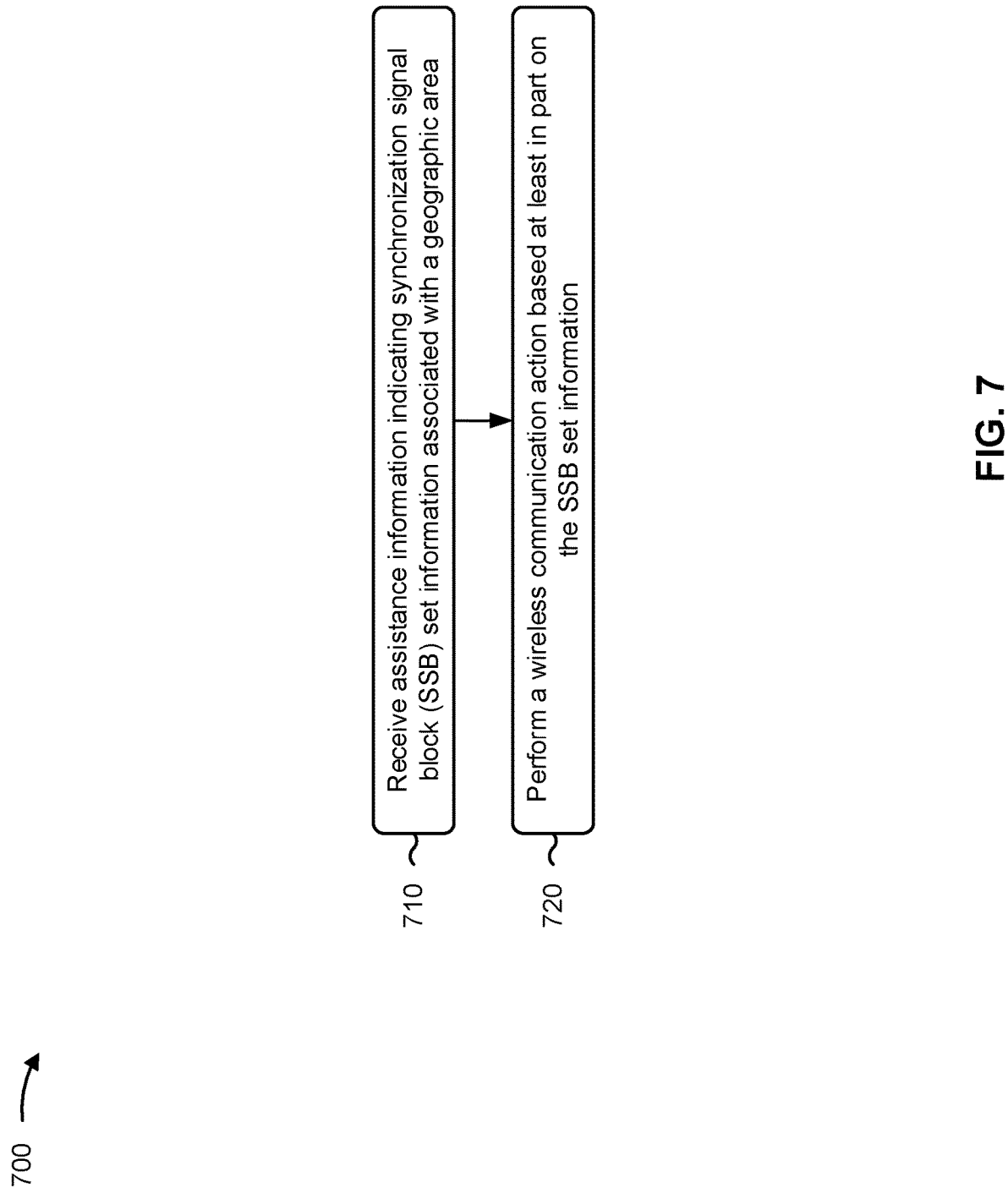
FIGS. 7 and 8 are diagrams illustrating example processes associated with signaling of assistance information associated with a geographic area, in accordance with the present disclosure.

FIG. 7 is a diagram illustrating an example process 700 performed, for example, by a UE, in accordance with the present disclosure. Example process 700 is an example where the UE (e.g., UE 505, 510, 515, 610, and/or 615) performs operations associated with signaling of assistance information associated with a geographic area.

As shown in FIG. 7, in some aspects, process 700 may include receiving assistance information indicating SSB set information associated with a geographic area (block 710). For example, the UE (e.g., using reception component 902, depicted in FIG. 9) may receive assistance information indicating SSB set information associated with a geographic area, as described above.

As further shown in FIG. 7, in some aspects, process 700 may include performing a wireless communication action based at least in part on the SSB set information (block 720). For example, the UE (e.g., using reception component 902 and/or transmission component 904, depicted in FIG. 9) may perform a wireless communication action based at least in part on the SSB set information, as described above.

Process 700 may include additional aspects, such as any single aspect or any combination of aspects described below and/or in connection with one or more other processes described elsewhere herein.

With respect to process 700, in some aspects, the SSB set information indicates one or more SSB sets associated with the geographic area.

With respect to process 700, in some aspects, the one or more SSB sets are associated with the geographic area based at least in part on an output of a machine learning component.

With respect to process 700, in some aspects, receiving the assistance information comprises receiving the assistance information while the UE is located in the geographic area.

With respect to process 700, in some aspects, the assistance information is UE-specific assistance information.

With respect to process 700, in some aspects, the assistance information is location-specific assistance information.

With respect to process 700, in some aspects, receiving the assistance information comprises receiving an SI broadcast message.

With respect to process 700, in some aspects, receiving the assistance information comprises receiving a unicast message.

In some aspects, process 700 includes receiving additional assistance information indicating a difference between the SSB set information and additional SSB set information.

With respect to process 700, in some aspects, receiving the assistance information comprises receiving a paging message including the assistance information and geographic location information.

In some aspects, process 700 includes transmitting a report to a base station indicating training data associated with a machine learning component of the base station configured to facilitate determining the SSB set information.

With respect to process 700, in some aspects, the training data comprises at least one of UE position information, beam angle information, or channel measurement information.

With respect to process 700, in some aspects, performing the wireless communication action comprises communicating with a base station using at least one of an initial access mode or a connected mode.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
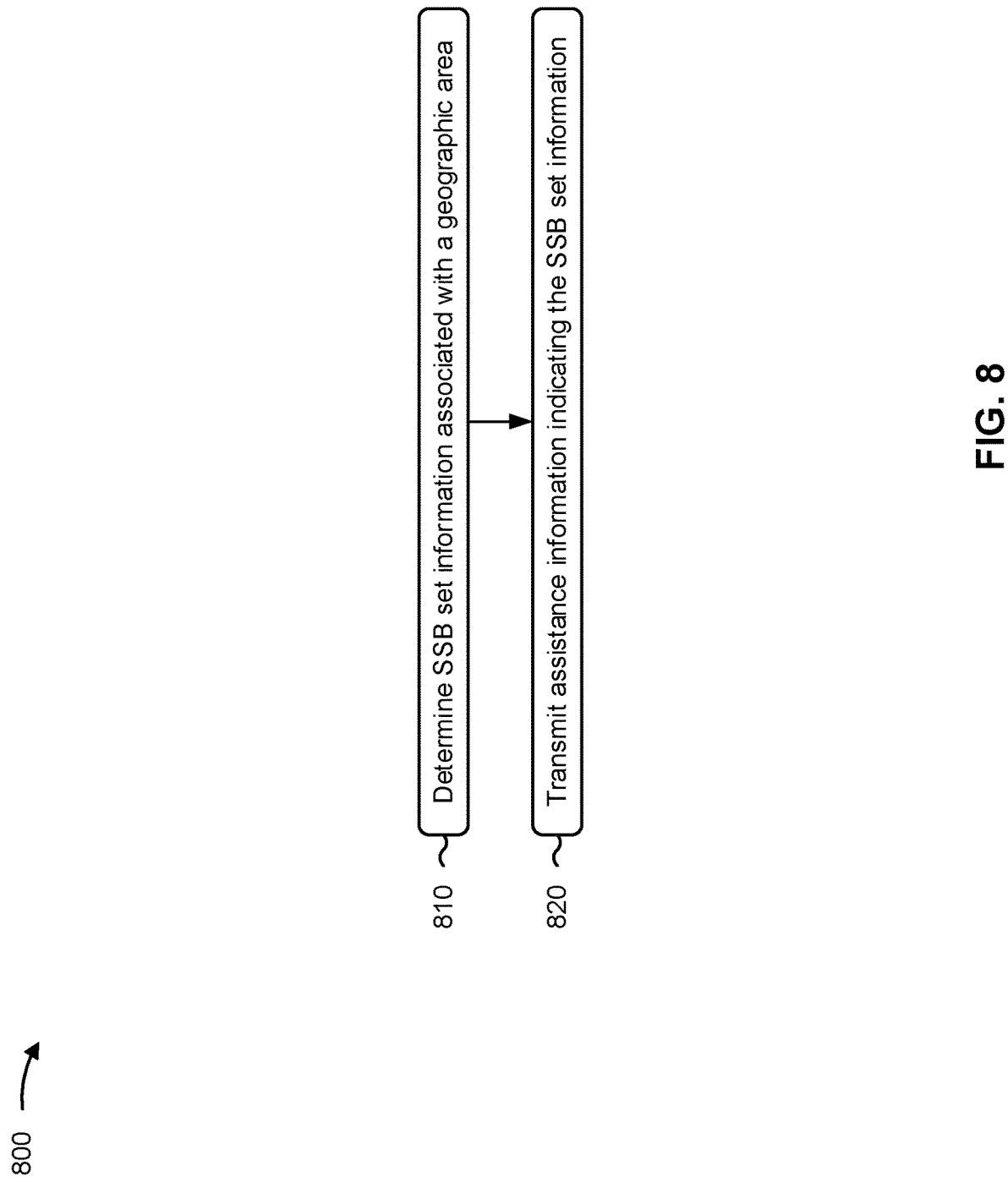

FIG. 8 is a diagram illustrating an example process 800 performed, for example, by a base station, in accordance with the present disclosure. Example process 800 is an example where the base station (e.g., base station 520 and/or 605) performs operations associated with signaling of assistance information associated with a geographic area.

As shown in FIG. 8, in some aspects, process 800 may include determining SSB set information associated with a geographic area (block 810). For example, the base station (e.g., using determination component 1008, depicted in FIG. 10) may determine SSB set information associated with a geographic area, as described above.

As further shown in FIG. 8, in some aspects, process 800 may include transmitting assistance information indicating the SSB set information (block 820). For example, the base station (e.g., using transmission component 1004, depicted in FIG. 10) may transmit assistance information indicating the SSB set information, as described above.

Process 800 may include additional aspects, such as any single aspect or any combination of aspects described below and/or in connection with one or more other processes described elsewhere herein.

With respect to process 800, in some aspects, the SSB set information indicates one or more SSB sets associated with the geographic area.

With respect to process 800, the one or more SSB sets are associated with the geographic area based at least in part on an output of a machine learning component.

With respect to process 800, transmitting the assistance information comprises transmitting the assistance information while a UE is located in the geographic area.

With respect to process 800, the assistance information is UE-specific assistance information.

With respect to process 800, the assistance information is location-specific assistance information.

With respect to process 800, transmitting the assistance information comprises transmitting an SI broadcast message.

With respect to process 800, transmitting the assistance information comprises transmitting a unicast message.

In some aspects, process 800 includes transmitting additional assistance information indicating a difference between the SSB set information and additional SSB set information.

With respect to process 800, transmitting the assistance information comprises transmitting a paging message including the assistance information and geographic location information.

In some aspects, process 800 includes receiving a report from a UE indicating training data associated with a machine learning component of the base station configured to facilitate determining the SSB set information.

With respect to process 800, the training data comprises at least one of UE position information, beaming angle information, or channeling measurement information.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
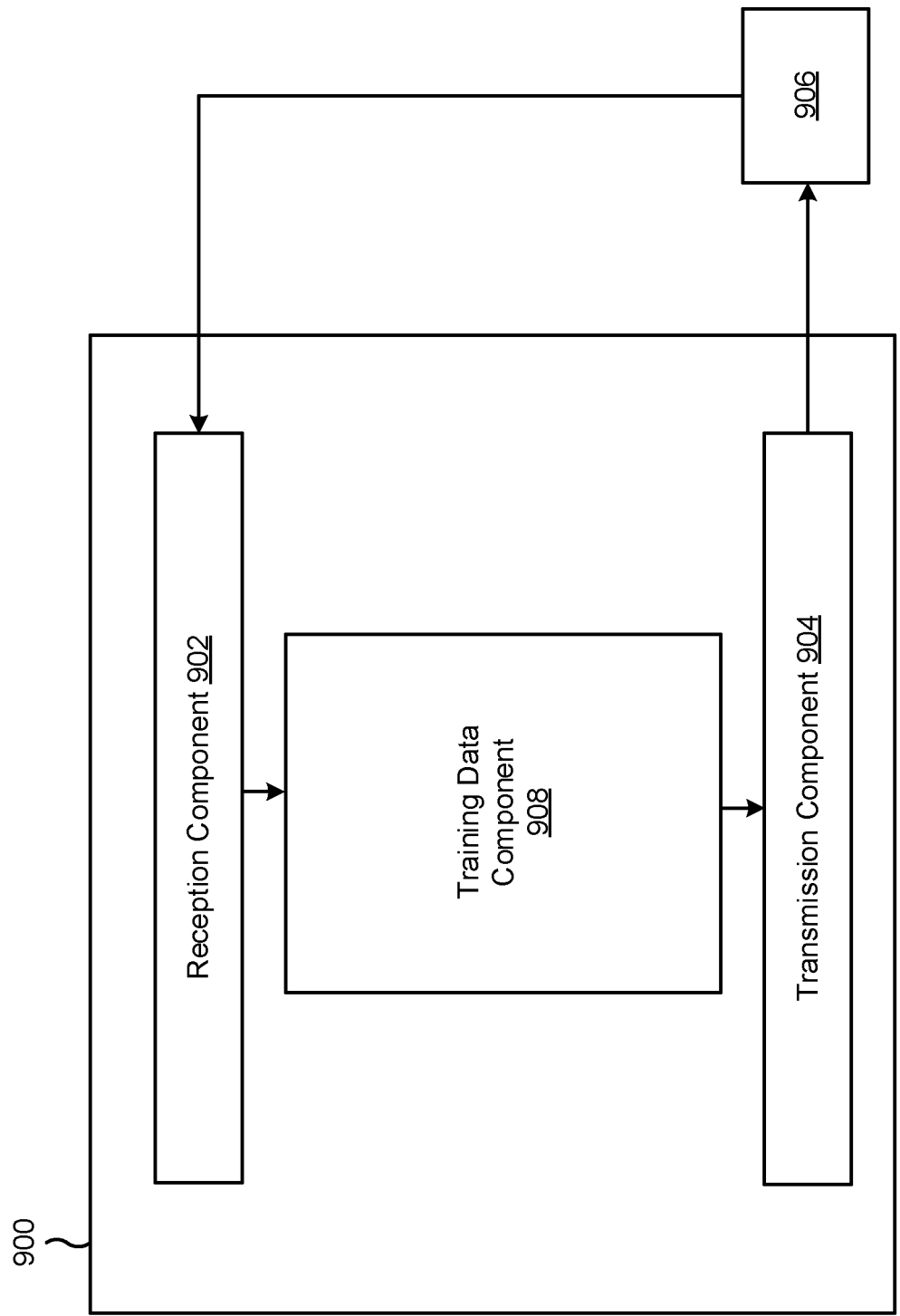
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a training data component 908.

In some aspects, the apparatus 900 may be configured to perform one or more operations described herein in connection with FIGS. 5 and 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive assistance information indicating SSB set information associated with a geographic area. The reception component 902 and/or the transmission component 904 may perform a wireless communication action based at least in part on the SSB set information. The reception component 902 may receive additional assistance information indicating a difference between the SSB set information and additional SSB set information. The transmission component 904 may transmit a report to a base station indicating training data associated with a machine learning component of the base station configured to facilitate determining the SSB set information.

For example, the training data component 908 may determine training data associated with a machine learning component of a base station. For example, the training data may include UE position information, angular information (e.g., AoA information and/or AoD information), and/or channel measurement information (e.g., sub-6 GHz PDP measurements), among other examples. In some aspects, the training data component 908 may include one or more antennas, a modulator, a transmit MIMO processor, a transmit processor, a controller/processor, a memory, or a combination thereof, of the UE described above in connection with FIG. 2. In some aspects, the training data component 908 may include the reception component 902 and/or the transmission component 904.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
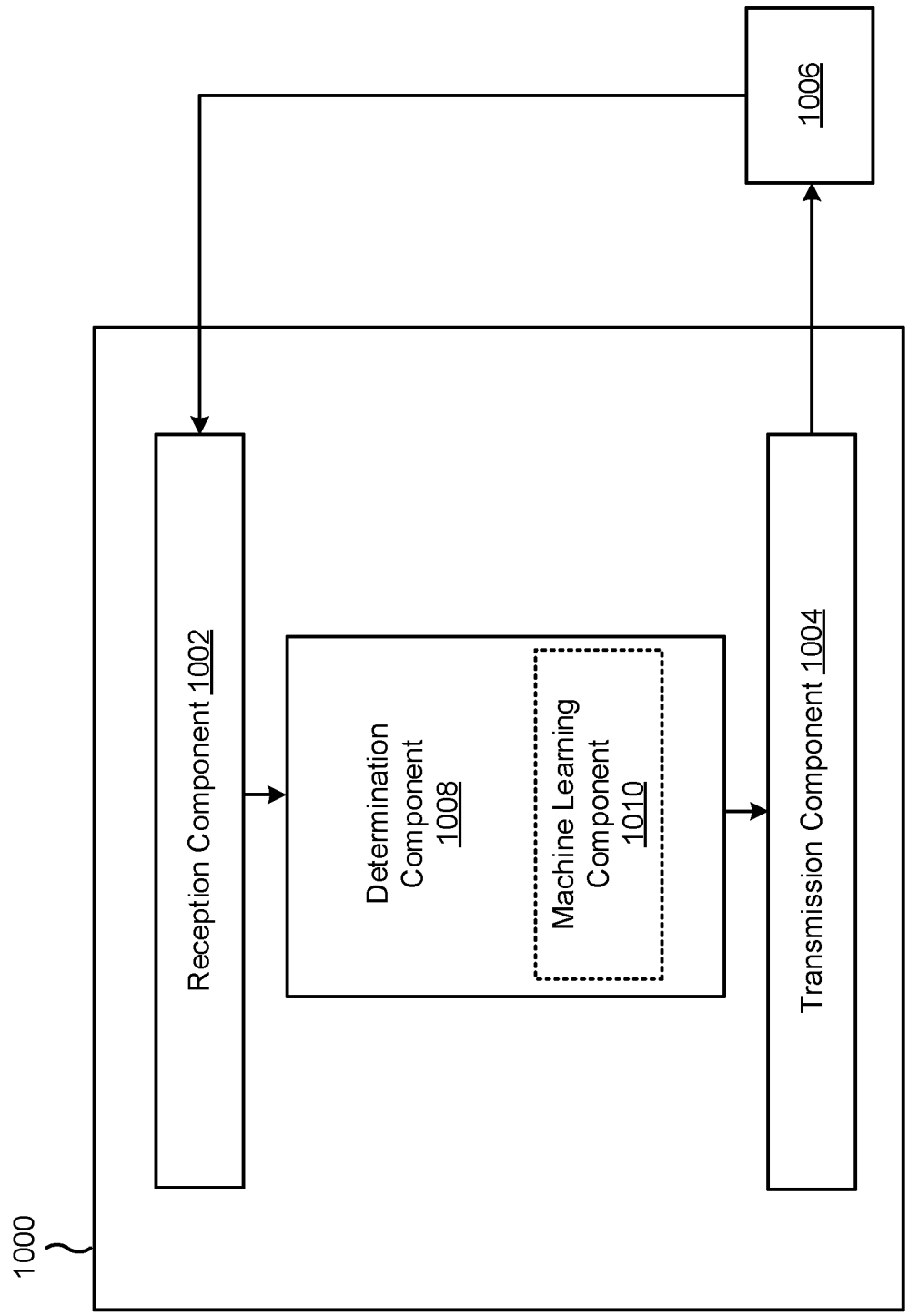

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008.

In some aspects, the apparatus 1000 may be configured to perform one or more operations described herein in connection with FIGS. 5 and 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The determination component 1008 may determine SSB set information associated with a geographic area. For example, in some aspects, the determination component 1008 may include a machine learning component 1010 and the determination component 1008 may determine the SSB set information based at least in part on an output of the machine learning component 1010, as described herein. In some aspects, the determination component 1008 may include one or more antennas, a modulator, a transmit MIMO processor, a transmit processor, a controller/processor, a memory, or a combination thereof, of the base station described above in connection with FIG. 2. In some aspects, machine learning component 1010 may include a controller/processor, a memory, or a combination thereof. In some aspects, the determination component 1008 and/or the machine learning component 1010 may include the reception component 1002 and/or the transmission component 1004.

The transmission component 1004 may transmit assistance information indicating the SSB set information. The transmission component 1004 may transmit additional assistance information indicating a difference between the SSB set information and additional SSB set information. The reception component 1002 may receive a report from a UE indicating training data associated with a machine learning component of the base station configured to facilitate determining the SSB set information.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: receiving assistance information indicating synchronization signal block (SSB) set information associated with a geographic area; and performing a wireless communication action based at least in part on the SSB set information.

Aspect 2: The method of Aspect 1, wherein the SSB set information indicates one or more SSB sets associated with the geographic area.

Aspect 3: The method of Aspect 2, wherein the one or more SSB sets are associated with the geographic area based at least in part on an output of a machine learning component.

Aspect 4: The method of any of Aspects 1-3, wherein receiving the assistance information comprises receiving the assistance information while the UE is located in the geographic area.

Aspect 5: The method of any of Aspects 1-4, wherein the assistance information is UE-specific assistance information.

Aspect 6: The method of any of Aspects 1-5, wherein the assistance information is location-specific assistance information.

Aspect 7: The method of any of Aspects 1-6, wherein receiving the assistance information comprises receiving a system information broadcast message.

Aspect 8: The method of any of Aspects 1-6, wherein receiving the assistance information comprises receiving a unicast message.

Aspect 9: The method of Aspect 8, further comprising receiving additional assistance information indicating a difference between the SSB set information and additional SSB set information.

Aspect 10: The method of any of Aspects 1-9, wherein receiving the assistance information comprises receiving a paging message including the assistance information and geographic location information.

Aspect 11: The method of any of Aspects 1-10, further comprising transmitting a report to a base station indicating training data associated with a machine learning component of the base station configured to facilitate determining the SSB set information.

Aspect 12: The method of Aspect 11, wherein the training data comprises at least one of: UE position information, beam angle information, or channel measurement information.

Aspect 13: The method of any of Aspects 1-12, wherein performing the wireless communication action comprises communicating with a base station using at least one of an initial access mode or a connected mode.

Aspect 14: A method of wireless communication performed by a base station, comprising: determining synchronization signal block (SSB) set information associated with a geographic area; and transmitting assistance information indicating the SSB set information.

Aspect 15: The method of Aspect 14, wherein the SSB set information indicates one or more SSB sets associated with the geographic area.

Aspect 16: The method of Aspect 15, wherein the one or more SSB sets are associated with the geographic area based at least in part on an output of a machine learning component.

Aspect 17: The method of any of Aspects 14-16, wherein transmitting the assistance information comprises transmitting the assistance information while a user equipment is located in the geographic area.

Aspect 18: The method of any of Aspects 14-17, wherein the assistance information is user equipment-specific assistance information.

Aspect 19: The method of any of Aspects 14-18, wherein the assistance information is location-specific assistance information.

Aspect 20: The method of any of Aspects 14-19, wherein transmitting the assistance information comprises transmitting a system information broadcast message.

Aspect 21: The method of any of Aspects 14-19, wherein transmitting the assistance information comprises transmitting a unicast message.

Aspect 22: The method of Aspect 21, further comprising transmitting additional assistance information indicating a difference between the SSB set information and additional SSB set information.

Aspect 23: The method of any of Aspects 14-22, wherein transmitting the assistance information comprises transmitting a paging message including the assistance information and geographic location information.

Aspect 24: The method of any of Aspects 14-23, further comprising receiving a report from a user equipment (UE) indicating training data associated with a machine learning component of the base station configured to facilitate determining the SSB set information.

Aspect 25: The method of Aspect 24, wherein the training data comprises at least one of: UE position information, beam angle information, or channel measurement information.

Aspect 26: An apparatus for wireless communication at a device, comprising a processor; memory coupled with the processor; and instructions stored in the memory and executable by the processor to cause the apparatus to perform the method of one or more of Aspects 1-13.

Aspect 27: A device for wireless communication, comprising a memory and one or more processors coupled to the memory, the memory and the one or more processors configured to perform the method of one or more of Aspects 1-13.

Aspect 28: An apparatus for wireless communication, comprising at least one means for performing the method of one or more of Aspects 1-13.

Aspect 29: A non-transitory computer-readable medium storing code for wireless communication, the code comprising instructions executable by a processor to perform the method of one or more of Aspects 1-13.

Aspect 30: A non-transitory computer-readable medium storing a set of instructions for wireless communication, the set of instructions comprising one or more instructions that, when executed by one or more processors of a device, cause the device to perform the method of one or more of Aspects 1-13.

Aspect 31: An apparatus for wireless communication at a device, comprising a processor; memory coupled with the processor; and instructions stored in the memory and executable by the processor to cause the apparatus to perform the method of one or more of Aspects 14-25.

Aspect 32: A device for wireless communication, comprising a memory and one or more processors coupled to the memory, the memory and the one or more processors configured to perform the method of one or more of Aspects 14-25.

Aspect 33: An apparatus for wireless communication, comprising at least one means for performing the method of one or more of Aspects 14-25.

Aspect 34: A non-transitory computer-readable medium storing code for wireless communication, the code comprising instructions executable by a processor to perform the method of one or more of Aspects 14-25.

Aspect 35: A non-transitory computer-readable medium storing a set of instructions for wireless communication, the set of instructions comprising one or more instructions that, when executed by one or more processors of a device, cause the device to perform the method of one or more of Aspects 14-25.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      receive, based at least in part on a location of the UE being within a threshold distance of a geographic area, assistance information indicating synchronization signal block (SSB) set information associated with the geographic area,
         wherein the SSB set information indicates one or more SSB sets likely to be detected by UEs in the geographic area,
         wherein the one or more SSB sets are indicated as likely to be detected by the UEs in the geographic area based at least in part on a likelihood score corresponding to each of the one or more SSB sets output from a machine learning component, and
         wherein the one or more SSB sets are further indicated as likely to be detected by the UEs in the geographic area based at least in part on the likelihood score corresponding to each of the one or more SSB sets satisfying a threshold; and
      perform a wireless communication action based at least in part on the SSB set information.

2. The apparatus of claim 1, wherein the one or more processors, to receive the assistance information, are configured to receive the assistance information while the UE is located in the geographic area.

3. The apparatus of claim 1, wherein the assistance information is UE-specific assistance information.

4. The apparatus of claim 1, wherein the assistance information is location-specific assistance information.

5. The apparatus of claim 1, wherein the one or more processors, to receive the assistance information, are configured to receive a system information broadcast message.

6. The apparatus of claim 1, wherein the one or more processors, to receive the assistance information, are configured to receive a unicast message.

7. The apparatus of claim 6, wherein the one or more processors are further configured to receive additional assistance information indicating a difference between the SSB set information and additional SSB set information.

8. The apparatus of claim 1, wherein the one or more processors, to receive the assistance information, are configured to receive a paging message including the assistance information and geographic location information.

9. The apparatus of claim 1, wherein the one or more processors are further configured to transmit a report to a network entity indicating training data associated with the machine learning component of the network entity configured to facilitate determining the SSB set information.

10. The apparatus of claim 9, wherein the training data comprises at least one of:
    UE position information,
    beam angle information, or
    channel measurement information.

11. The apparatus of claim 1, wherein the one or more processors, to perform the wireless communication action, are configured to communicate with a network entity using at least one of an initial access mode or a connected mode.

12. The apparatus of claim 1, wherein the one or more processors, to perform the wireless communication action, are configured to attempt to decode the one or more SSB sets based at least in part on the one or more SSB sets being likely to be detected by the UEs in the geographic area.

13. The apparatus of claim 1, wherein the SSB set information further indicates probabilities associated with detecting each of the one or more SSB sets in the geographic area.

14. An apparatus for wireless communication at a network entity, comprising:
    one or more memories; and
    one or more processors, coupled to the one or more memories, configured to:
       determine synchronization signal block (SSB) set information associated with a geographic area; and
       transmit, based at least in part on a location of user equipments (UEs) being within a threshold distance of the geographic area, assistance information indicating the SSB set information,
          wherein the SSB set information indicates one or more SSB sets likely to be detected by the UEs in the geographic area,
          wherein the one or more SSB sets are indicated as likely to be detected by the UEs in the geographic area based at least in part on a likelihood score corresponding to each of the one or more SSB sets output from a machine learning component, and
          wherein the one or more SSB sets are further indicated as likely to be detected by the UEs in the geographic area based at least in part on the likelihood score corresponding to each of the one or more SSB sets satisfying a threshold.

15. The apparatus of claim 14, wherein the one or more processors, to transmit the assistance information, are configured to transmit the assistance information while a UE is located in the geographic area.

16. The apparatus of claim 14, wherein the assistance information is UE-specific assistance information.

17. The apparatus of claim 14, wherein the assistance information is location-specific assistance information.

18. The apparatus of claim 14, wherein the one or more processors, to transmit the assistance information, are configured to transmit a system information broadcast message.

19. The apparatus of claim 14, wherein the one or more processors, to transmit the assistance information, are configured to transmit a unicast message.

20. The apparatus of claim 19, wherein the one or more processors are further configured to transmit additional assistance information indicating a difference between the SSB set information and additional SSB set information.

21. The apparatus of claim 14, wherein the one or more processors, to transmit the assistance information, are configured to transmit a paging message including the assistance information and geographic location information.

22. The apparatus of claim 14, wherein the one or more processors are further configured to receive a report from a UE indicating training data associated with the machine learning component of the network entity configured to facilitate determining the SSB set information.

23. The apparatus of claim 22, wherein the training data comprises at least one of:
UE position information,
beam angle information, or
channel measurement information.

24. A method of wireless communication performed by a user equipment (UE), comprising:
receiving, based at least in part on a location of the UE being within a threshold distance of a geographic area, assistance information indicating synchronization signal block (SSB) set information associated with the geographic area,
wherein the SSB set information indicates one or more SSB sets likely to be detected by UEs in the geographic area,
wherein the one or more SSB sets are indicated as likely to be detected by the UEs in the geographic area based at least in part on a likelihood score corresponding to each of the one or more SSB sets output from a machine learning component, and
wherein the one or more SSB sets are further indicated as likely to be detected by the UEs in the geographic area based at least in part on the likelihood score corresponding to each of the one or more SSB sets satisfying a threshold; and
performing a wireless communication action based at least in part on the SSB set information.

25. The method of claim 24, wherein receiving the assistance information comprises:
receiving the assistance information indicating a difference between the SSB set information and additional SSB set information.

26. A method of wireless communication performed by a network entity, comprising:
determining synchronization signal block (SSB) set information associated with a geographic area; and
transmitting, based at least in part on a location of user equipments (UEs) being within a threshold distance of the geographic area, assistance information indicating the SSB set information,
wherein the SSB set information indicates one or more SSB sets likely to be detected by the UEs in the geographic area,
wherein the one or more SSB sets are indicated as likely to be detected by the UEs in the geographic area based at least in part on a likelihood score corresponding to each of the one or more SSB sets output from a machine learning component, and
wherein the one or more SSB sets are further indicated as likely to be detected by the UEs in the geographic area based at least in part on the likelihood score corresponding to each of the one or more SSB sets satisfying a threshold.

27. The method of claim 26, further comprising receiving a report from a UE indicating training data associated with the machine learning component of the network entity configured to facilitate determining the SSB set information.

* * * * *